(12) United States Patent
Drake

(10) Patent No.: US 9,416,033 B2
(45) Date of Patent: Aug. 16, 2016

(54) ANTISOLVENT PROCESS FOR TREATING LIQUIDS THAT INCLUDE HIGH TOTAL DISSOLVED SOLIDS

(71) Applicant: Ronald N. Drake, Helena, MT (US)

(72) Inventor: Ronald N. Drake, Helena, MT (US)

(73) Assignee: Drake Water Technologies, Inc., Helena, MT (US)

( * ) Notice: Subject to any disclaimer, the term of this patent is extended or adjusted under 35 U.S.C. 154(b) by 709 days.

(21) Appl. No.: 13/706,943

(22) Filed: Dec. 6, 2012

(65) Prior Publication Data

US 2013/0140234 A1 Jun. 6, 2013

Related U.S. Application Data

(60) Provisional application No. 61/567,404, filed on Dec. 6, 2011.

(51) Int. Cl.
| | |
|---|---|
| *C02F 9/00* | (2006.01) |
| *C02F 1/16* | (2006.01) |
| *C02F 1/02* | (2006.01) |
| *C02F 1/38* | (2006.01) |
| *C02F 1/52* | (2006.01) |
| *C02F 1/44* | (2006.01) |
| *C02F 1/00* | (2006.01) |

(52) U.S. Cl.
CPC ............ *C02F 1/5272* (2013.01); *C02F 1/02* (2013.01); *C02F 1/16* (2013.01); *C02F 9/00* (2013.01); *C02F 1/38* (2013.01); *C02F 1/441* (2013.01); *C02F 2001/007* (2013.01); *C02F 2001/5218* (2013.01)

(58) Field of Classification Search
CPC ............ C02F 9/00; C02F 1/281; C02F 1/283; C02F 1/42; C02F 1/02; C02F 1/04; C02F 1/048; C02F 1/06; C02F 1/16; C02F 1/26; C02F 1/265; C02F 1/38; C02F 1/385; C02F 1/441; C02F 1/52; C02F 1/5272; C02F 1/58; C02F 2001/007; C02F 2001/5218; B01D 15/00

See application file for complete search history.

(56) References Cited

U.S. PATENT DOCUMENTS

| | | | | | |
|---|---|---|---|---|---|
| 2,934,419 | A | * | 4/1960 | Cook ........................ | C01D 3/06 210/723 |
| 3,163,599 | A | * | 12/1964 | Salutsky ................... | C02F 9/00 205/536 |
| 3,177,139 | A | * | 4/1965 | Kimberlin, Jr. ......... | B01D 11/04 210/642 |
| 3,350,292 | A | * | 10/1967 | Weinberger .............. | B01J 39/00 203/33 |
| 3,424,675 | A | * | 1/1969 | Davison ............. | B01D 11/0488 210/187 |

(Continued)

*Primary Examiner* — David C Mellon
(74) *Attorney, Agent, or Firm* — Neugeboren O'Dowd PC

(57) ABSTRACT

The present invention provides a low energy alternative to conventional thermal/evaporation processes for "zero liquid discharge" treatment of strong saline brines. The products of the process include a salt-free liquid and solid salt. In particular, an antisolvent can be mixed with liquids containing high total dissolved solids. The mixture can be chilled, whereby solid salt is precipitated and separated from the mixture at near ambient temperature leaving a mixed liquor. The antisolvent can be selected from a class of organic compounds that form solutions with salt brines that exhibit a critical solution temperature lower than a critical solution temperature of the salt brines alone. The mixed liquor can be heated to a temperature above its lower critical solution temperature to produce an antisolvent liquid phase for recycle to the process. Finally, a reduced salinity aqueous phase can be polished by reverse osmosis or other conventional technology to produce clean water for discharge or beneficial use.

16 Claims, 4 Drawing Sheets

(56) References Cited

U.S. PATENT DOCUMENTS

| | | | | |
|---|---|---|---|---|
| 3,463,814 A | * | 8/1969 | Yee | C01F 5/22 159/47.2 |
| 3,715,306 A | * | 2/1973 | Mar | C02F 1/26 210/634 |
| 3,725,267 A | * | 4/1973 | Gelblum | C02F 1/042 159/DIG. 13 |
| 3,983,032 A | * | 9/1976 | Hess | C02F 1/265 210/642 |
| 4,036,749 A | * | 7/1977 | Anderson | B01D 61/025 203/7 |
| 4,083,781 A | * | 4/1978 | Conger | B01D 61/022 210/651 |
| 4,180,547 A | * | 12/1979 | Chirico | C01B 7/096 23/302 T |
| 4,430,227 A | * | 2/1984 | Hanson | C02F 1/26 210/642 |
| 4,725,425 A | * | 2/1988 | Lesher | C01B 7/096 202/267.1 |
| 5,221,528 A | * | 6/1993 | Jongema | C01D 3/16 23/302 T |
| 5,378,366 A | * | 1/1995 | Yen | 210/667 |
| 5,814,224 A | * | 9/1998 | Khamizov | B01J 39/02 210/638 |
| 5,833,863 A | * | 11/1998 | Richards et al. | 210/712 |
| 6,280,630 B1 | * | 8/2001 | Ramsay | C02F 1/52 210/711 |
| 6,482,305 B1 | * | 11/2002 | Mani | B01D 61/445 204/534 |
| 7,404,898 B2 | * | 7/2008 | Clausse | C02F 1/529 210/650 |
| 2004/0055955 A1 | * | 3/2004 | Davis | B01D 61/44 210/652 |
| 2004/0195160 A1 | * | 10/2004 | Max | A23L 2/08 210/177 |
| 2006/0196836 A1 | * | 9/2006 | Arakel | B01D 61/025 210/723 |
| 2007/0045100 A1 | * | 3/2007 | Wright | B01D 1/14 203/49 |
| 2008/0121585 A1 | * | 5/2008 | Mavis | C02F 1/441 210/652 |
| 2008/0142422 A1 | * | 6/2008 | Cotoras Tadic | C02F 9/00 210/151 |
| 2009/0001020 A1 | * | 1/2009 | Constantz | B01D 61/025 210/652 |
| 2009/0045116 A1 | * | 2/2009 | Escribano | B01D 1/0058 210/170.07 |
| 2010/0101928 A1 | * | 4/2010 | Kanda | C02F 1/04 202/185.3 |

* cited by examiner

Lower Critical Solution Temperature Phase Diagram for NaCl Saturated DMIPA/Water Solutions

ANTISOLVENT PROCESS FOR TREATING LIQUIDS THAT INCLUDE HIGH TOTAL DISSOLVED SOLIDS

PRIORITY

This application is a nonprovisional conversion of U.S. Patent Application Ser. No. 61/567,404, filed Dec. 6, 2011, entitled ANTISOLVENT PROCESS FOR TREATING LIQUIDS THAT INCLUDE HIGH TOTAL DISSOLVED SOLIDS, which is incorporated herein by reference.

FIELD OF THE INVENTION

The present invention relates to liquid purification systems, and more specifically to removal of total dissolved solids from liquids by means of an antisolvent liquid.

BACKGROUND OF THE INVENTION

Current activities in the U.S. and Canadian coal bed methane (CBM) plays are near a standstill due to the depressed natural gas market, with Henry Hub prices averaging less than $4.50/Mcf. However, shale play activities (e.g., Bakken (MT and ND), Marcellus (PA and NY), Barnett, and Eagle Ford (TX)) are undergoing rapid development with no signs of slowing down.

The U.S. Geological Survey estimates mean undiscovered volumes of 3.65 billion barrels of oil, 1.85 trillion cubic feet of associated and dissolved natural gas, and 148 million barrels of natural gas liquids in the Bakken Shale Formation of the Williston Basin Province, Montana and North Dakota (http://geology.com/usgs/bakken-formation-oil.shtml). Of this resource, the Bakken Shale Play underlies 11 Montana counties, including Daniels, Dawson, Fallon, Garfield, McCone, Prairie, Richland, Roosevelt, Sheridan, Valley, and Wibaux.

However, inability to economically manage or dispose of the high total dissolved solids (TDS) frac-return waters produced during shale play development is a costly impediment to resource extraction due to both transportation and disposal costs. High TDS waters exhibit greater than 5000 ppm. Additionally, ever increasing regulation of these produced and frac-water discharges threaten economic development of fossil resources. A recent article in the New York Times, entitled "Regulation Lax as Gas Wells' Tainted Water Hits Rivers—"We're burning the furniture to heat the house" (http://www.nytimes.com/2011/02/27/us/27gas.html?_r=2&hp) is one of many examples regarding the difficulties presented in disposing of these high TDS waters. The movie "Gasland" (http://www.gaslandthemovie.com) provides graphic examples of the regulatory and material issues related to both production and disposal of shale play produced and frac-return waters.

With the advent of horizontal drilling and fracturing of shale plays, large quantities of extremely high TDS frac-return waters are now produced in regions where disposal and recycle options are extremely limited.

In any event, before ultimate disposition, (e.g., deep hole injection, recycle, reuse, conversion to beneficial use, or discharge to surface waters) produced water and frac-return water usually must be conditioned by removal of some or nearly all TDS. Most conventional treatment processes (e.g., evaporation, distillation, reverse osmosis, electrodialysis, ion exchange, etc.) are merely water separation processes that generate a larger volume of low-TDS product water and a smaller volume of high-TDS concentrate or brine—the high-TDS concentrate or brine often requires costly disposal.

At present, there are three major methods in use for ultimate disposal of high-TDS aqueous fluids; injection into geologic formations, natural evaporation, and forced evaporation. Successful injection into an adjacent formation is only possible if there exists an aquiclude or substantial aquitard between the pumped formation and the injected formation. Absent such a confining geologic formation, the injected water will simply flow back to the pumped wells and the net effect is to pump water in a circle.

High TDS fluids can also be transported for commercial disposal or other disposal via a Class II injection well. However, such disposal options are typically not universally applicable and economically viable. For instance, economic disposal via Class II injection wells often entails: (1) existence of an appropriate receiving formation; (2) construction and permitting of the well and surface facilities for surge storage water analysis and chemical and physical water adjustment and high-pressure injection; (3) propinquity of the source of fluid to the injection well site, and existence of transportation infrastructure and services as needed to ensure reasonable transportation costs; (4) compatibility of the injected fluid with the receiving formation; and (5) continued availability and capacity of disposal services.

Evaporation of high TDS fluids to dryness may be effected by a number of means. If climate, terrain, capacity, and regulations allow, high-TDS fluids can be put in a pit or pond (usually lined) for natural or enhanced (e.g., spray, aeration, etc.) evaporation. In the rare cases where natural evaporation is feasible, it may be a good, cost-effective means of drying salt solutions. It is only feasible, however, at sites where the annual pan evaporation rate substantially exceeds the annual precipitation rate. That means only arid regions or actual deserts are normally suitable for use of natural evaporation. Even then the technology is not free. Impoundments must be lined, and often they must be fenced and netted in order to prevent wildlife intrusion. Finally, since evaporation only occurs at the surface of the impoundment, evaporation ponds usually exhibit a large surface area for the amount of water evaporated. Hence, natural evaporation is also not an effective and generally applicable option for high-TDS fluid disposal.

As an alternative to these methods, forced evaporation, or evaporation via man-made heat sources, has been attempted by many vendors and service providers. Evaporation of water is energy intensive, and most thermal processes for treating high-TDS fluids employ some type of vapor recompression, multiple effect, or countercurrent flash technology to reduce energy consumption. Unfortunately, these evaporation/condensation schemes employ relatively small temperature differences across the evaporator/condenser heat exchanger surfaces. Consequently, extended heat transfer surfaces, which are expensive to fabricate, are required for reasonable throughput.

Extended heat transfer surfaces include designs that maximize the ratio of surface area to volume, and can include structures such as closely spaced tubes, spiral or corrugates plates, fins, pins, baffles, and expansion joints, to name a few. In addition, to prevent corrosion and stress corrosion cracking, high-alloys and exotic materials are typically employed (e.g., Hastelloy, Inconel, C-276, titanium, etc.). The combination of the extended heat transfer surface and the high alloy and exotic materials greatly increases the size and capital cost of facilities carrying out forced evaporation of high-TDS fluids.

There is therefore a need in the art for affordable, efficient, and mobile zero liquid discharge (ZLD) treatment technology for high-TDS waters generated during oil and gas production. Preferably such water is suitable for unrestricted discharge to surface waters and for other beneficial uses, such as irrigation, aquaculture, and land application.

SUMMARY OF THE INVENTION

In one embodiment, the invention may be characterized as a method for removing dissolved solids from aqueous liquid. In this embodiment, aqueous liquid is mixed with an antisolvent. The antisolvent is chosen such that the mixture of aqueous liquid and antisolvent exhibits a lower critical solution temperature. At temperatures below the lower critical solution temperature, the aqueous solution and antisolvent are miscible in all proportions. Also, the mixture of antisolvent and aqueous liquid exhibits limited capacity to dissolve salt. At temperatures above the lower critical solution temperature the miscibility of the aqueous solution and antisolvent is limited, and two phases are formed that exhibit different densities. One phase can be an antisolvent-rich phase or "antisolvent phase" and the other can be an aqueous-rich phase or "aqueous phase".

The aqueous liquid and antisolvent are first mixed at a temperature that is below the lower critical solution temperature of the mixture, and where the antisolvent and the aqueous liquid are miscible in all proportions. Below the lower critical solution temperature, the mixture of aqueous liquid and antisolvent exhibits reduced capacity to maintain ionic species in solution, and thus solid salts are precipitated from the mixture.

Following separation of the solid salts from the mixture, the mixture is heated to above its lower critical solution temperature, where the antisolvent and aqueous liquid become substantially immiscible, and form two liquid phases of different density that can be separated by gravity decanting to produce 1) a stream of antisolvent for re-use, and 2) an aqueous liquid product stream exhibiting reduced total dissolved solids.

The aqueous liquid product stream may be further purified or "polished" by conventional (ion-exchange, nanofiltration, reverse osmosis, etc.) means to yield clean water for discharge or beneficial use and a high total dissolved solids reject stream that may be fed back into the treatment method described above for further treatment.

In this manner, aqueous liquids exhibiting high total dissolved solids may be economically purified at low temperature to yield clean water without generation of secondary liquid wastes.

BRIEF DESCRIPTION OF THE DRAWINGS

Various additional objects and advantages and a more complete understanding of the present invention are apparent and more readily appreciated by reference to the following Detailed Description and to the appended claims when taken in conjunction with the accompanying Drawings wherein:

DETAILED DESCRIPTION

This disclosure describes systems, methods, and apparatus that use temperature swing antisolvents to precipitate salts from high-TDS liquids at near ambient temperatures.

For the purposes of this disclosure a "liquor" or "mother liquor" is the part of a solution that is left over after crystallization.

Figure 1:
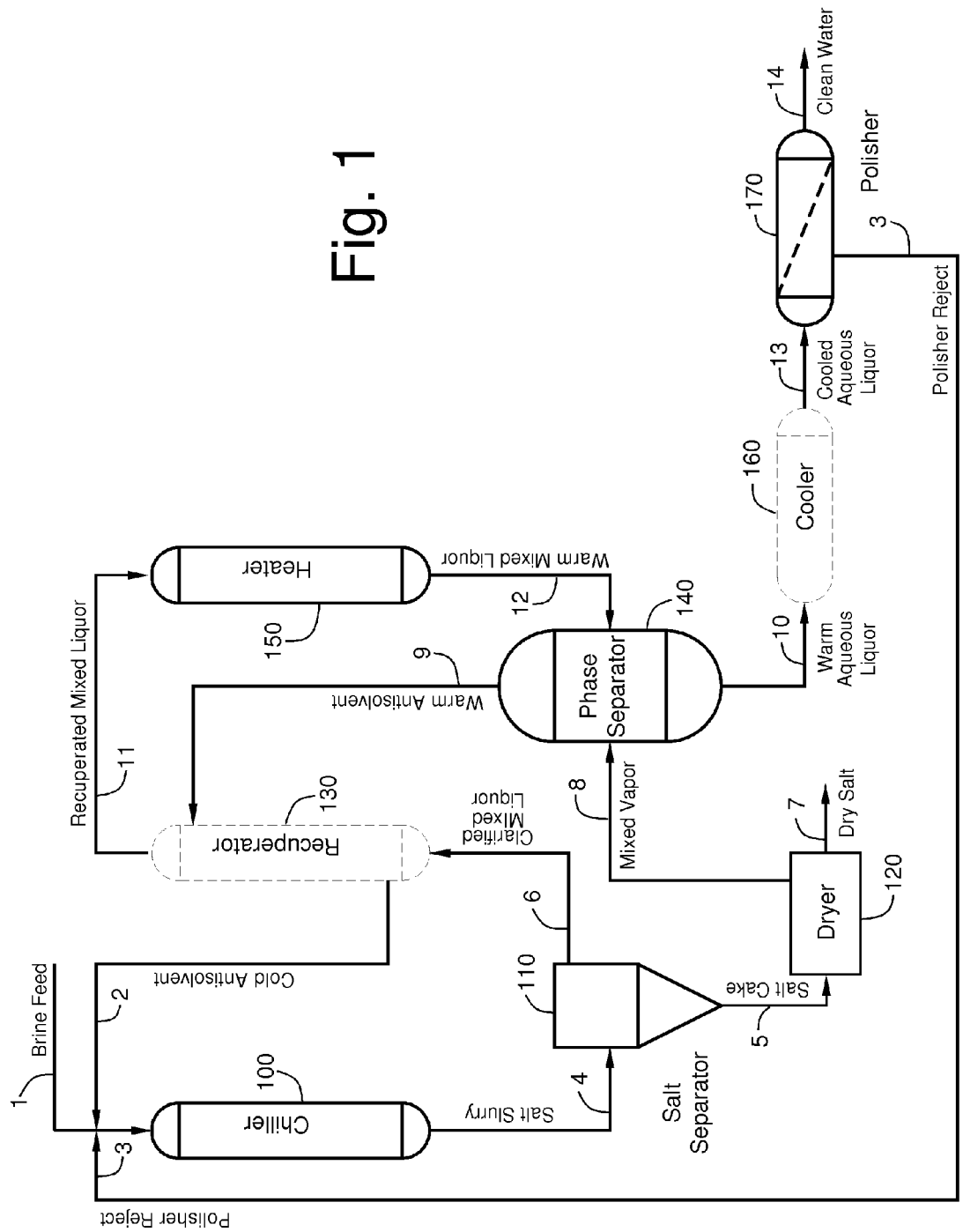
FIG. 1 is a material flow and major equipment arrangement diagram in accordance with one embodiment of the antisolvent process for treating liquids that include high total dissolved solids.

As shown in FIG. 1, in a preferred embodiment, a brine feed stream 1 or other high TDS stream, an antisolvent stream 2, and a polisher reject stream 3 are fed to a chiller 100 or other temperature-reduction system forming a mixture within the chiller 100. The chiller 100 reduces the temperature of the mixed feed streams to below a lower critical solution temperature of the mixture causing salt to precipitate and a salt slurry 4 to exit the chiller 100.

Solid salt particles are separated from salt slurry 4 in a salt separator 110 to produce a damp salt cake 5 and a mixed liquor 6. The mixed liquor can be known as a clarified mixed liquor 6 in some embodiments. Residual moisture and antisolvent are removed from damp salt cake 5 using a dryer 120, or other heating vessel, that produces a dry salt product 7 and a mixed vapor 8. The mixed liquor 6 can then be heated, either indirectly (e.g., via recuperator 13), directly (e.g., via heater 150), or via both direct and indirect means. The mixed liquor 6 can then be passed to a phase separator 140 such that the temperature of the mixed liquor 6 inside the phase separator 140 is greater than the lower critical solution temperature of the mixed liquor 6. As a result, the mixed liquor 6 separates into an antisolvent phase 9 and an aqueous liquor 10. As the antisolvent phase 9 and the aqueous phase 10 are typically at a higher-than-ambient temperature, they can be referred to as a warm antisolvent 9 and a warm aqueous liquor 10, respectively.

The antisolvent phase 9 can be returned to the chiller 100 as a recycle stream to mix with high TDS liquids to produce salt slurry 4 in the chiller 100. The aqueous liquor 10 can be passed to a polisher 170 and polished to produce clean water 14. Any residual dissolved solids (e.g., salt) can be returned to the chiller 100 as a polisher reject 3 stream.

Optionally, a recuperator 130 is used to warm the mixed liquor 6 exiting the salt separator 110. Recuperator 130 uses sensible heat provided by the antisolvent phase 9 from the phase separator 140 to produce a recuperated mixed liquor 11. In doing so, the recuperator 130 also transfers heat from the antisolvent phase 9 to the mixed liquor 6, thus warming the mixed liquor 6 and cooling the antisolvent phase 9 such that a cooled antisolvent stream 2 is returned to the chiller 100. Such heat transfer is typically via indirect means. For instance, the recuperator 130 can be embodied as a heat exchanger.

A heater 150 can be used to add heat to the recuperated mixed liquor 11 thus raising the temperature of the recuperated mixed liquor 11 to above the lower critical solution temperature of the mixture within the phase separator 140. Although the heater 150 and the phase separator 140 are illustrated as separate components, in some embodiments, the heater 150 and the phase separator 140 can be integrated into a single system or vessel. The heater can produce a warm mixed liquor 12.

The phase separator 140 can use density difference separation or other means to separate the warm mixed liquor 12 into an antisolvent phase 9 and an aqueous liquor phase 10. In some embodiments, the mixed vapor 8 can also be added to the phase separator 140, and upon contacting the warm mixed liquor 12, the mixed vapor can condense and transfer heat to the warm mixed liquor 12. In many instances the flow rate of the mixed vapor 8 is substantially less than a flow rate of the warm mixed liquor 12. Nonetheless, the addition of the mixed vapor 8 to the phase separator 140 can assist in heating the contents of the phase separator 140 and thus produce a warmer antisolvent 9 than when the mixed vapor 8 is not provided to the phase separator 140.

An optional cooler 160 can reduce the temperature of the aqueous liquor 10 by removing heat to produce a cooled aqueous liquor 13. The cooled aqueous liquor 13 is fed to the polisher 170, which can be embodied as an aqueous phase polisher 170 in one embodiment, The clean water 14 produced by the polisher 170 may meet specifications for discharge or beneficial use. Polisher reject 3 containing an elevated salt concentration can be recycled to the inlet of chiller 100.

The separator 110 can be embodied as any device that separates solid particles from liquid media. Some non-limiting examples include, a settling tank, a clarifier, a hydrocyclone, a centrifuge, a sieve, a screen, and a filter.

Those of skill in the art will recognize that the components, arrangement of components, couplings between components, and material flows are illustrative only and not intended to limit the scope of the disclosure. Variations on the illustrated embodiment can be implemented without departing from the scope of the invention. For example, chiller 100 may be implemented as, but is not limited to, the following embodiments: air cooled heat exchangers, water cooled heat exchangers, glycol cooled heat exchangers, brine cooled heat exchangers, direct refrigerant cooled heat exchangers, shell and tube heat exchangers, spiral plate heat exchangers, double pipe heat exchangers, etc. As another example, in some embodiments, the polisher reject stream 3 can be excluded. In a further example, the dryer 120 can be embodied by two or more drying components or systems. As yet another example, the recuperator 130 and the aqueous phase cooler 160 can each or both be excluded in certain embodiments. These are just a few of many examples showing variations on FIG. 1 that one of skill in the art will recognize as falling within the scope of the disclosure.

Figure 2:
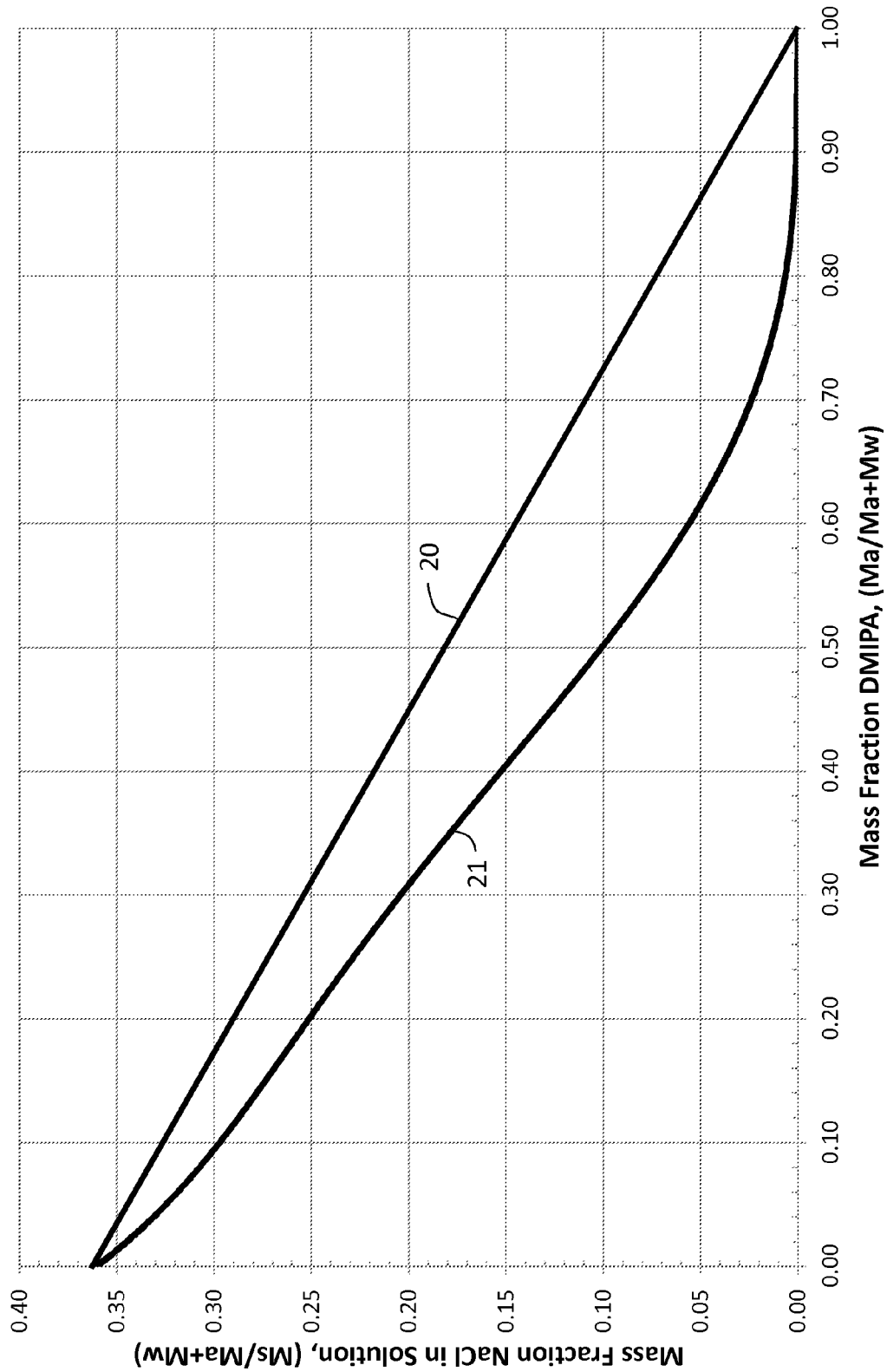
FIG. 2 is a graph showing the solubility of a salt in mixtures of an antisolvent and water.

FIG. 2 shows an antisolvent concentration, relative to a salt concentration, that can lead to ambient-temperature precipitation of salt. A saturated salt mixing line 20 shows the mass fraction of salt in solution when saturated salt brine, or another high TDS liquid, is diluted with clean water. The antisolvent equilibrium line 21 shows the mass fraction of salt in solution when saturated salt brine, or another high TDS liquid, is mixed with an antisolvent such as dimethylisopropylamine (DMIPA). At any selected mass fraction of the antisolvent, the vertical distance between the antisolvent equilibrium line 21 and the saturated salt mixing line 20, represents the mass fraction of salt removed by addition of the antisolvent. As the concentration of antisolvent in an antisolvent/brine mixture increases, the capacity of the mixture to maintain the salt in solution decreases.

FIG. 2 shows the above-described salt-antisolvent relationship for the specific case of NaCl as the salt and dimethylisopropylamine (DMIPA) as the antisolvent. As seen in the chart, the mixture's ability to maintain the salt in solution approaches zero at antisolvent concentrations above about 0.85. Thus, if using DMIPA to precipitate salt from a brine solution at ambient temperatures, a DMIPA-to-water concentration of greater than 0.85 may be preferred. Research has shown that salts, other than NaCl are also subject to precipitation by antisolvent addition, and residual concentrations are in approximate proportion to the ratio of saturated solubility of NaCl to the saturated solubility of the other salt species.

Figure 3:
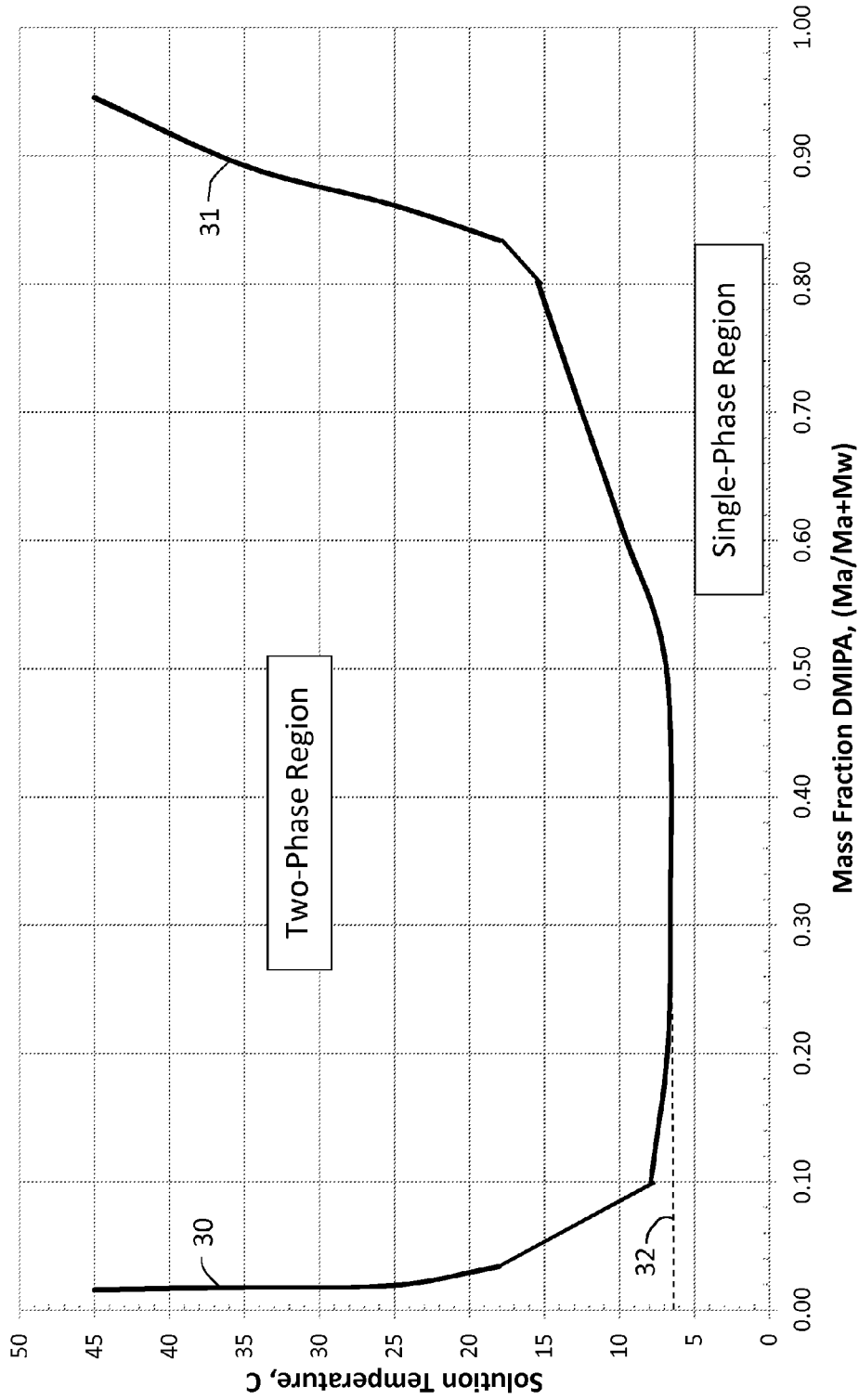
FIG. 3 is a phase diagram showing composition and phase separation characteristics describing a lower critical solution temperature behavior of an antisolvent and water.

FIG. 3 shows the effects on miscibility of a saturated salt water solution with an antisolvent for different concentrations of antisolvent and different temperatures of the mixture. Below the lower critical solution temperature 32, salt saturated water and antisolvent (e.g., DMIPA) are miscible in all proportions. As the temperature is increased above the lower critical solution temperature 32, the mixture separates into an aqueous phase 30 and an antisolvent phase, which can be an organic phase in some embodiments. In some embodiments, the organic phase is the antisolvent phase 9 in FIG. 1. The aqueous phase 30 can comprise mostly aqueous solution with some organic portion. The organic phase 31 can comprise mostly organic solution with some aqueous portion. The intersection of line 31 and the solution temperature, or tie line, indicates, on the x-axis, a composition of the antisolvent phase. The intersection of line 30 and the solution temperature, or tie line, indicates, on the x-axis, a composition of the aqueous phase. When using DMIPA as the antisolvent, good phase separation can be accomplished with a temperature swing of about 40 C and the recovered organic phase can be returned to the process. This example shows that larger temperature swings typically lead to greater separation of the phases and purer phases (e.g., more water as a ratio to antisolvent in the aqueous phase and more antisolvent as a ratio to water in the antisolvent phase).

Figure 4:
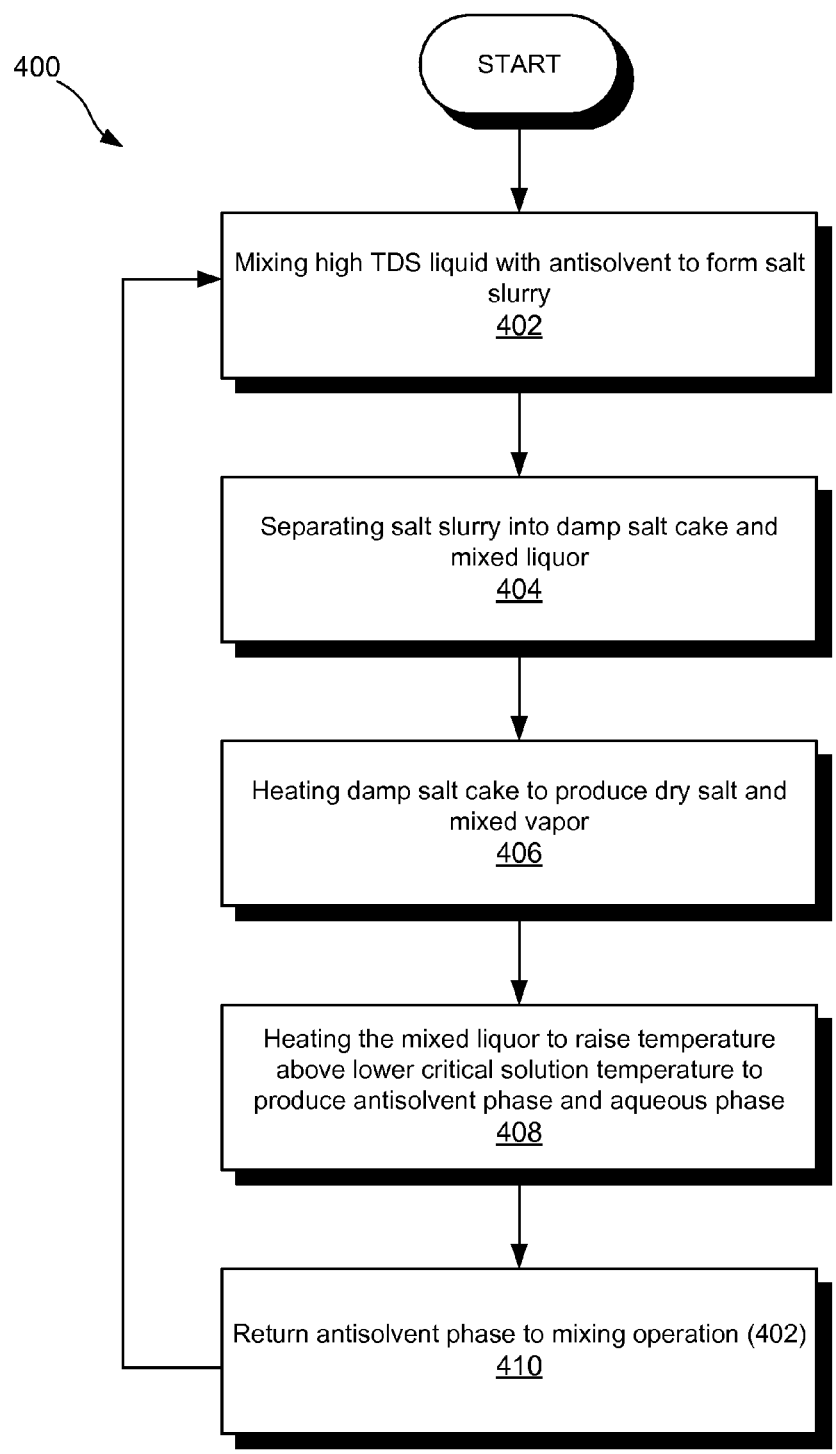
FIG. 4 illustrates a method for treating liquids containing high total dissolved solids, to produce substantially salt-free liquid and solid salt.

FIG. 4 illustrates a method 400 for treating liquids containing high total dissolved solids, to produce substantially salt-free liquid and solid salt. The method 400 can include a mixing operation 402 wherein high TDS liquid is mixed with an antisolvent. This forms a mixture having a lower critical solution temperature than the high TDS liquid alone. The mixture also can exist at a first temperature below the lower critical solution temperature thus resulting in precipitation of salt from the mixture to form a salt slurry. The temperature can be achieved via removing heat, e.g., via a chiller such as chiller 100 in FIG. 1. The salt slurry can then be separated in a separating operation 404 producing a damp salt cake and a mixed liquor. A first heating operation 406 can then heat the damp salt cake to produce a dry salt and a mixed vapor. A second heating operation 408 can heat the mixed liquor to raise a temperature of the mixed liquor above a lower critical solution temperature of the mixed liquor thus producing an antisolvent phase and an aqueous phase. Finally, a return antisolvent phase to mixing operation 410 can return the antisolvent phase to the mixing operation 402.

In further embodiments, the aqueous phase can be polished to remove residual dissolved solids thus producing a clean liquid and a polisher reject stream. The polisher rejects stream can be returned to the mixing operation 402 and mixed with the high TDS liquid, the antisolvent, and the returned antisolvent from operation 410. The polishing can involve reverse osmosis. The polishing may also involve removing heat from the aqueous phase before or during the polishing.

The second heating operation 408 can include indirectly transferring heat from the antisolvent phase to the mixed liquor. As an alternative or as a serial process, the second heating operation 408 can include direct heating of the mixed liquor via a heater such as heater 150 in FIG. 1. The second heating operation 408 can also involve bringing the mixed vapor into contact with the mixed liquor, for instance, via a phase separator such as phase separator 140 in FIG. 1. This contact can cause heat to transfer from the mixed vapor to the mixed liquor, thus enhancing phase separation of the antisolvent and aqueous phases. The mixed vapor can include a mixture of aqueous and antisolvent vapors.

Despite the focus on DMIPA, there are many antisolvents that exhibit lower critical solution temperatures that render them feasible for use in the subject process. Some examples, include, but are not limited to alkylamines, alkoxy alcohols, and ethers.

In an embodiment, the herein-described systems, methods, and apparatus can be used to recover solid anhydrous sodium sulfate from brines generated by processes and apparatus detailed in U.S. Pat. No. 7,368,059 and U.S. Pat. No. 7,862,715 when deployed in connection with on-site treatment of coal bed methane (CBM) produced water. Embodiments may obviate the need for chemical recovery impoundments at remote CBM produced water treatment sites, and may also permit deployment at sites where other salt disposal options (e.g., pits, ponds, trucking, etc.) are precluded by climate, terrain, lack of infrastructure, or regulation.

Further advantages include the production of higher value anhydrous sodium sulfate when compared to the lower value Glauber's salt now recovered from evaporative chemical recovery impoundments. A further advantages of the herein disclosed systems, methods, and apparatus is reduced energy use for desalination and other high TDS liquid treatments. Additionally, these systems, methods, and apparatus can successfully treat liquids that exhibit concentrations of total dissolved solids that are far greater than is feasible for treatment by existing water treatment processes (e.g., reverse osmosis, nanofiltration, electrodialysis, ion exchange, etc.). Aspects of the herein disclosed systems, methods, and apparatus may also supplant competing thermal technologies by providing mobile, modular, on-site ZLD treatment of high TDS fluids at substantially lower capital and operating cost when compared to existing ZLD systems.

Further advantages are that the systems, methods, and apparatus, in many variations, require no high power rotating equipment and produce little to no secondary wastes. Process energy can be provided by any convenient low-grade heat source (e.g., <70° C.). The primary, if not the only, products are solid salt and cleaned water. The antisolvent can be an internally recycled working fluid that does not require disposal. Yet further advantages include avoiding the need for an extended, high-alloy or exotic metal heat transfer surface, and avoiding use of process equipment that can be provided in easily transportable modules to facilitate on-site treatment of high TDS fluids at reduced throughputs that are not economical for conventional and existing evaporation/crystallization technologies.

In some embodiments, the herein disclosed systems, methods, and apparatus can be used to further treat the outputs from known high TDS liquid treatment operations such as reverse osmosis, ion exchange, electrodialysis, and natural or thermal evaporation.

A preferred use of the technology is as a TDS reduction head-end to prepare feed water for polishing using other conventional water treatment technologies (e.g., ion exchange, nanofiltration, reverse osmosis, etc.). When so employed, reject streams and waste brines produced by the polishing systems may be recycled to the antisolvent TDS reduction head-end, thus eliminating a major cost of conventional water treatment. In other words, the polisher reject 3 can be fed back to the temperature-reduction vessel 100 or chiller 100.

In conclusion, embodiments of the present invention provide, among other things, systems, methods, and apparatus that enable zero liquid discharge treatment of high TDS fluids. Those skilled in the art can readily recognize that numerous variations and substitutions may be made in the invention, its use, and its configuration to achieve substantially the same results as achieved by the embodiments described herein. Accordingly, there is no intention to limit the invention to the disclosed exemplary forms. Many variations, modifications, and alternative constructions fall within the scope and spirit of the disclosed invention.

What is claimed is:

1. A system for treating a high total dissolved solids liquid, the system comprising:
   a temperature-reduction vessel that receives a high TDS liquid and an antisolvent such that a mixture is formed inside the temperature-reduction vessel at a temperature below a critical solution temperature of the mixture, thereby causing precipitation of salt and production of a salt slurry;
   a separator receiving the salt slurry and separating the salt slurry into a mixed liquor and a salt cake;
   a heating vessel receiving the salt cake and applying heat to the salt cake to produce dry salt and a mixed vapor;
   a phase separator receiving a recuperated mixed liquor, a temperature of the recuperated mixed liquor in the phase separator being greater than a lower critical solution temperature of the recuperated mixed liquor, and thus causing the recuperated mixed liquor to separate into an antisolvent phase and an aqueous phase;
   a recuperator receiving the antisolvent phase and the mixed liquor and indirectly transferring heat from the antisolvent phase to the mixed liquor thus turning the mixed liquor into the recuperated mixed liquor;
   a heater that applies heat to the recuperated mixed liquor such that the temperature of the recuperated mixed liquor in the phase separator is greater than the lower critical solution temperature of the recuperated mixed liquor; and
   a fluid path between the phase separator and the temperature-reduction vessel for passing antisolvent back into the temperature-reduction vessel,
   wherein the phase separator is coupled to the heating vessel, the heater, and the recuperator.

2. The system of claim 1, further comprising a polisher that polishes the aqueous phase producing clean water and returning any solution having a concentration of salt to the temperature-reduction vessel.

3. The system of claim 2, wherein the antisolvent is at a lower temperature than the solution having a concentration of salt therein.

4. The system of claim 2, wherein the phase separator includes a mixed vapor input coupled to a mixed vapor output of the heating vessel, the mixed vapor input configured to receive the mixed vapor from the heating vessel.

5. The system of claim 1, wherein the recuperator includes a first antisolvent output coupled to an input of the temperature-reduction vessel and configured to pass antisolvent to the temperature-reduction vessel.

6. The system of claim 1, wherein the phase separator includes a second antisolvent output coupled to an input of the recuperator and configured to pass antisolvent to the recuperator.

7. A system for treating a high total dissolved solids liquid, the system comprising:
   a temperature-reduction vessel that receives a high TDS liquid and an antisolvent such that a mixture is formed inside the temperature-reduction vessel at a temperature below a critical solution temperature of the mixture, thereby causing precipitation of salt and production of a salt slurry;

a separator receiving the salt slurry and separating the salt slurry into a mixed liquor and a salt cake;

a heating vessel receiving the salt cake and applying heat to the salt cake to produce dry salt and a mixed vapor;

a phase separator receiving a recuperated mixed liquor, a temperature of the recuperated mixed liquor in the phase separator being greater than a lower critical solution temperature of the recuperated mixed liquor, and thus causing the recuperated mixed liquor to separate into an antisolvent phase and an aqueous phase, the phase separator including a mixed vapor input coupled to a mixed vapor output of the heating vessel, the mixed vapor input configured to receive the mixed vapor from the heating vessel;

a recuperator receiving the antisolvent phase and the mixed liquor and indirectly transferring heat from the antisolvent phase to the mixed liquor thus turning the mixed liquor into the recuperated mixed liquor; and a heater that applies heat to the recuperated mixed liquor such that the temperature of the recuperated mixed liquor in the phase separator is greater than the lower critical solution temperature of the recuperated mixed liquor.

8. The system of claim 7, wherein the temperature reduction vessel maintains liquids therein at a steady-state temperature at or below 25° C.

9. The system of claim 7, further comprising a polisher that polishes the aqueous phase producing clean water and returning any solution having a concentration of salt to the temperature-reduction vessel.

10. The system of claim 7, wherein the antisolvent is at a lower temperature than the solution having a concentration of salt therein.

11. A system comprising:

a temperature control vessel having an input and an output, the input configured to receive high TDS waste fluids;

a separator coupled to the output of the temperature control vessel and having a first and second output;

a dryer coupled to the first output of the separator and having a first and second output;

a heater coupled to the second output of the separator via a first path and further having an output; and a phase separator having a first and second input and a first and second output, the first input of the phase separator coupled to the first output of the dryer, the second input of the phase separator coupled to the output of the heater, the first output of the phase separator coupled to the input of the temperature control vessel via a second path.

12. The system of claim 11, further comprising a polisher coupled to the second output of the phase separator, and having a first and second output, the first output of the polisher coupled to the input of the temperature control vessel.

13. The system of claim 11, wherein the temperature control vessel is configured to chill fluids therein to below a lower critical solution temperature or heat fluids therein to above an upper critical solution temperature, and wherein the phase separator is configured to heat fluids therein to above the lower critical solution temperature or chill fluids therein to below the upper critical solution temperature.

14. The system of claim 13, wherein the lower critical solution temperature is 25° C. or lower.

15. The system of claim 11, wherein the second path between the phase separator and the temperature control vessel includes a recuperator, and the first path between the separator and the heater includes the recuperator, wherein the recuperator is arranged to transfer thermal energy between the first path and the second path.

16. The system of claim 15, wherein the recuperator is arranged so as to preclude direct physical contact between liquids in the first and second paths.

* * * * *